April 20, 1965  BUNJIRO ICHIJO  3,179,881
MULTIPLE-TUNED ELECTRICAL MEASURING APPARATUS
FOR REACTANCES AND RESISTANCES
Filed Sept. 25, 1962  4 Sheets-Sheet 1
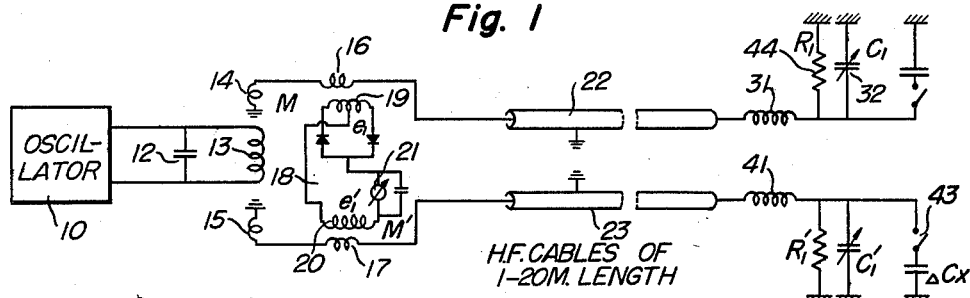
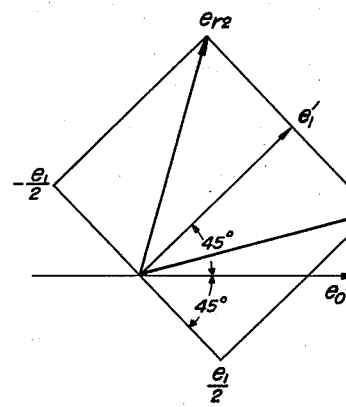
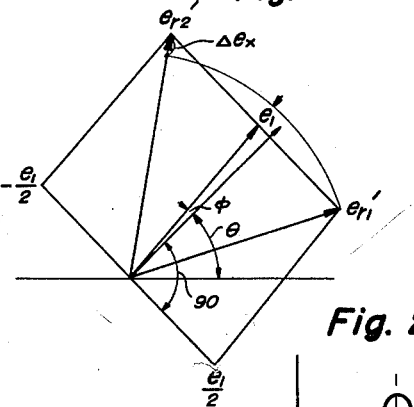
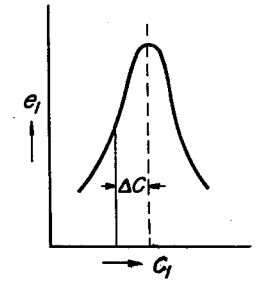
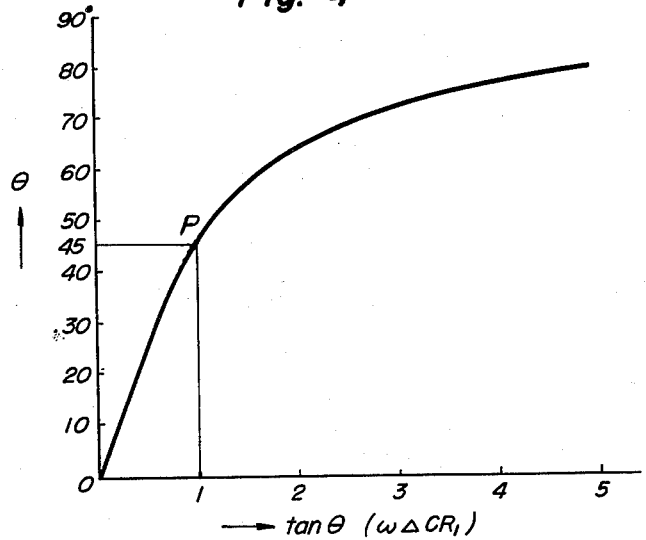
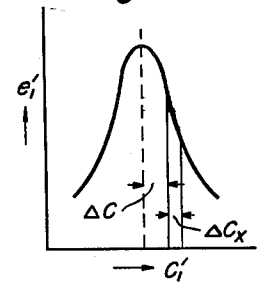

$Ig = 4Ke_0e_x \tan\phi$
$= 4Ke_0e_x \dfrac{\omega \Delta C_x R_l}{1+\omega^2 \Delta C^2 R_l^2}$

Fig. 9
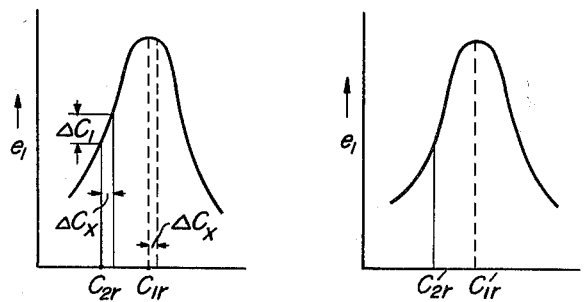
Fig. 11
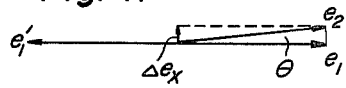
Fig. 13
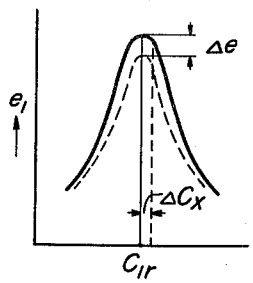
Fig. 10A  Fig. 10B
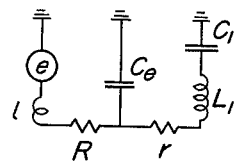
$l = l_1 + l_2$   $\omega^2 l (C_e + C_t) = 1$ United States Patent Office 3,179,881
Patented Apr. 20, 1965

3,179,881
MULTIPLE-TUNED ELECTRICAL MEASURING APPARATUS FOR REACTANCES AND RESISTANCES
Bunjiro Ichijo, Hamamatsu-shi, Japan, assignor to Tsugami Mfg. Co., Ltd., Tokyo, Japan, a corporation of Japan
Filed Sept. 25, 1962, Ser. No. 226,095
Claims priority, application Japan, Dec. 13, 1961, 36/45,282; May 4, 1962, 37/18,348
5 Claims. (Cl. 324—60)

The present invention relates to electrical measuring apparatus, and particularly to electric circuit arrangement for measuring with high stability and high sensitivity electrical reactances, resistances, energy losses, etc. of electrical elements and materials.

An object of the present invention is to provide portable type measuring apparatus of the kind specified.

Another object of the present invention is to provide direct-reading measuring apparatus of the kind specified.

Other objects, and particularities of the present invention will become obvious from the following detailed descriptions with reference to the accompanying drawings, in which;

FIGURE 1 is a circuit diagram showing an embodiment of the present invention;

FIGURES 2A and 2B are curve diagrams showing the relationship between the voltages induced in the detecting circuit and the variable capacitances of the tuning circuit shown in FIGURE 1;

FIGURES 3A and 3B are vector diagrams relating to the circuit shown in figures;

FIGURE 4 is a curve diagram showing the relationship between $\theta$ and $\tan \theta$ shown in FIGURES 3A and 3B;

FIGURE 9 shows curves for explanation of reactance measurement by use of the circuit shown in FIGURE 8;

FIGURES 10A and 10B show operational principle of the apparatus shown in FIG. 8;

FIGURE 11 is a vector diagram relating to FIGURE 9;

FIGURE 13 shows curves for explanation of resistance measurement by use of the circuit shown in FIG. 12.

Figure 5:
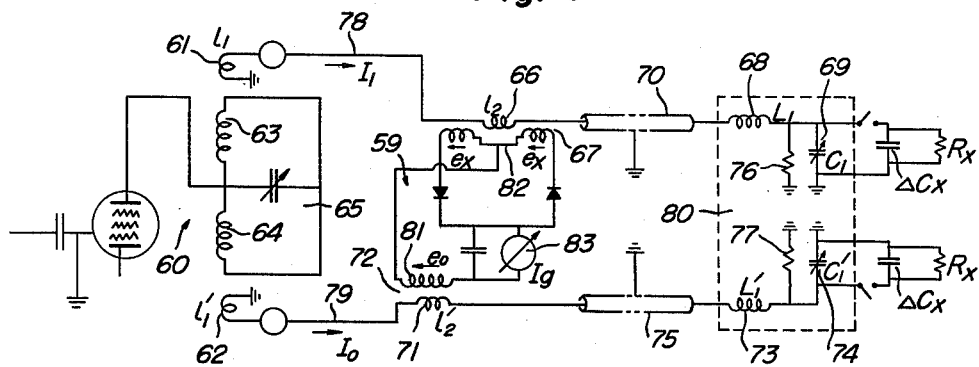
FIGURE 5 is a circuit diagram showing another embodiment of the present invention.

Referring to FIGURE 1, a high frequency oscillator 10 is stabilized of its frequency and comprises a tank circuit 11 consisting of a capacitance 12 and an inductance 13. Inductance coils 14 and 15 are of few (2 or 3) turns for inducing voltages therein, respectively, while inductance coils 16 and 17 respectively connected to coils 14 and 15 are of five or six turns for detection purpose. These detection inductance coils are inductively coupled with coils 19 and 20 with coefficients of mutual induction M and M', respectively, in which high frequency voltages $e_1$ and $e'_1$ are induced, respectively. Voltages $e_1$ and $e'_1$ cause current flow through a phase discriminating circuit 18 to energize an indicating meter 21. Thus, the meter is caused to deflect by a minute change in capacitance in the measuring circuit to be described. The coils 14, 16, and 15, 17 are respectively connected to main tuning circuits 31, 32 and 41, 42 through high frequency coaxial cables of suitable length 22 and 23, respectively. Coils 14, 16, 31 and variable capacitor 32 form a series tuning circuit, and coils 15, 17, 41 and variable capacitor 42 form another series tuning circuit. These two tuning circuits are identical in their construction and circuit constants, and are arranged symmetrical with respect to the inductance coil 13 and the capacitor 12, it is preferable that all the corresponding circuit elements in the two tuning circuits are identical in constructions and performances.

With the above arrangement, the capacitance $C_1$ of the capacitor 32 and the capacitance $C'_1$ of the capacitor 42 are first set to shift in opposite senses by $\pm \Delta C$ from the tuning points as shown in FIGS. 2A and 2B, the value of $\Delta C$ is selected to satisfy the following equation:

$$\tan \theta = \omega \cdot \Delta C \cdot R_1 = 1 \qquad (1)$$

Then, the secondary induced voltages $e_1$ and $e'_1$ will respectively have $\pm 45$ degree phase differences with respect to the voltages $e_0$ and $e'_0$ induced into the coils 14 and 15. In this case, the vector diagram for the discriminating circuit 18 is as shown in FIGURE 3A. Since the resultant voltages $e_{r1}$ and $e_{r2}$ are of the same magnitude, the deflection of indicating meter 21 is zero.

Now, a minute capacitance $\Delta C_x$ to be measured is connected in parallel with the capacitor 42 by closing a switch 43, and the phase of the voltage $e'_1$ is caused to leads by an angle $\phi$, as shown in FIGURE 3B. The angle $\phi$ is represented by the following equation:

$$\tan \phi = \frac{\omega \cdot \Delta C_x \cdot R_1}{1 + \omega^2 \cdot \Delta C^2 \cdot R_1^2} \qquad (2)$$

Where $R_1$ is the resistance of the resistor 44.

As seen from the Equation 2, $\phi$ is proportioned to $\Delta C_x$. In this case, the voltage vector diagram is as shown in FIGURE 3B, and the resultant voltages $e'_{r1}$ and $e'_{r2}$ differ from each other by $\Delta e_x$ which causes an output current $\Delta I$ to flow through the indicating meter 21.

The two tuning circuits are characterized by the fact that they consist of identical corresponding elements resulting in identical overall constructions, and consequently, when set to shift from the tuning points in opposite senses by $\pm \Delta C$ or by $\pm 45$ degrees, respectively, the phase shifts of the voltages $e_1$ and $e'_1$ are theoretically equal, even if the circuit constants change by minor amounts under changes in temperature and humidity, and therefore, the phase angle of 90 degrees between the voltages $e_1$ and $e'_1$ does never vary, and no output is produced to energize the meter 21. Thus, the stability is extremely high.

As a matter of fact, however, even if identical elements are employed for corresponding parts, their temperature coefficients are not necessarily identical as it means, and even if the voltages $e_1$ and $e'_1$ are set $\pm 45$ degrees respectively as aforementioned, the stability cannot necessarily be maximum. In such a case, the sense of the fluctuating output should be observed, and in view thereof, the phases of $e_1$ and $e'_1$ should be pre-adjusted suitably, such as for example, to $+50°$ and $-40°$, or $+43°$ and $-47°$, respectively.

As is obvious from FIG. 4 showing the relation between $\tan \theta$ and $\theta$, the extents of shift of $\theta$ in relation to minor changes in $$\frac{\partial \theta}{\partial (\Delta C)}$$

or $\Delta C$ slightly vary above and below the point $p$, and it is possible to compensate for any difference between temperature coefficients of the circuit elements by minute changes in sensitivity of the two circuits by virtue of the different settings above and below the point P as aforementioned.

Referring now to FIGURE 5, small inductance coils 61 and 62 are magnetically coupled with inductance coils 63 and 64, respectively, of a tank circuit 65 of a high frequency oscillating circuit 60, and voltages $e_1$ and $e'_1$ are induced in the coils 61 and 62, respectively. A small inductance coil 66 is provided at the primary side of a detecting transformer 67, and is connected in series with an inductance coil 68 and a tuning capacitor 69 through a high frequency coaxial cable 70. Another small inductance coil 71 is provided at the primary side of a detecting transformer 72 and is connected in series with an inductance coil 73 and a tuning capacitor 74 through a high frequency coaxial cable 75. The transformers 67 and 72 constitute part of a discriminating circuit 59.

Two test specimens, having equal capacitances $\Delta C_x$ are connected in parallel with the coil 68 and the capacitor 69 and with the coil 73 and the capacitor 74, respectively.

Figure 7A:
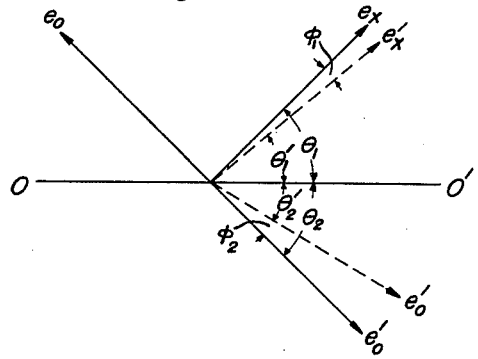
FIGURES 7A and 7B are vector diagrams relating to the circuit shown in FIGURE 5.
Figure 6:
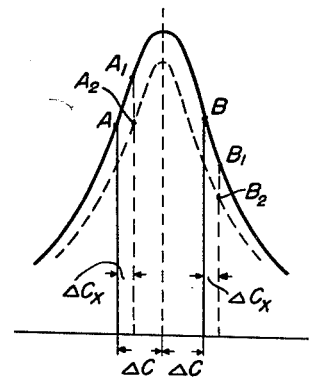
FIGURE 6 is a curve diagram showing the operational principle of the circuit shown in FIGURE 5.
Figure 7B:
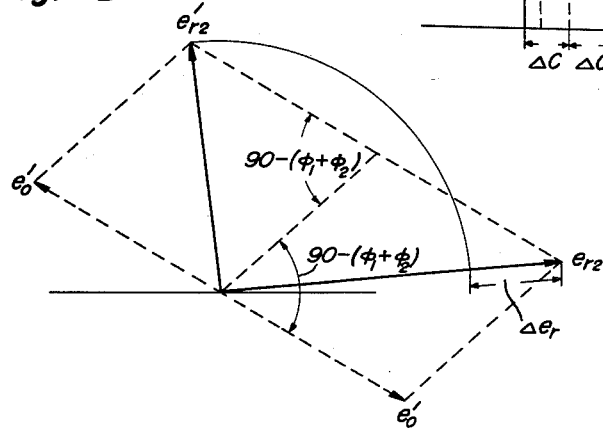

In the tuning circuit 80 including coils 68 and 73, and capacitors 69 and 74, the variable capacitors 69 and 74 are set so that their tuning points are shifted respectively, in opposite senses by $\Delta C$ as shown in FIGURE 6 and that the tuning circuits satisfy equations $\omega \cdot \Delta C \cdot R_1 = 1$ and $\omega \cdot \Delta C \cdot R'_1 = -1$, where $R_1$ and $R'_1$ are resistances of resistors 76 and 77. Then, the phase of current I, flowing through line 78 lags that of the voltage $e_1$ by 45 degrees and the phase of the current $I_0$ flowing through line 79 leads that of the voltage $e'_1$ by 45 degrees. Thus, the vector relation between the voltage $e_0$ induced in the secondary coil 81 of the transformer 72 and the voltage $e_x$ induced in the secondary coil 82 of the transformer 67 is as shown in FIGURE 7A. The directions of the currents in the phase discriminating circuit 59 are shown by arrows $I_1$ and $I_0$ in FIGURE 5. As the phase difference between the voltages $e_0$ and $e_x$ is 90 degrees, the ampere meter 83 indicates zero point.

In the tuning circuits, the test specimens are placed at the same time. As shown in FIGURE 6, the tuning circuits are set initially at points A and B on a tuning curve, respectively. In accordance with the shifting represented by $\Delta C$, the point A is transferred to a point $A_1$ and the point B is transferred to point $B_1$. When the test specimens are placed in the circuits, the point $A_1$ is transferred to point $A_2$ and the point $B_1$ is transferred to point $B_2$ by virtue of the resistance $R_x$ representing the loss of the specimens.

The above actions are explained as undermentioned, referring to the vector diagram of FIGURE 7A. Vectors $e_x$ and $e_0$ drawn at angles $\theta_1$ and $\theta_2$ (45 degrees) to O–O' line are transferred to the positions indicated by $e'_x$ and $e'_0$ at angles $\theta'_1$ and $\theta'_2$ to the O–O' line, respectively. Therefore, an output $\Delta e_r$ is produced in the discriminating circuit 59, and operates the indicator 83 to indicate the same. This indication of the indicator 83 corresponds to the loss of the test specimens.

The reason why the loss only of the specimens can be measured independently of their capacitance is as follows:

If the equivalent parallel resistance $R_2$ is considerably larger than the resistance $R_1$ representing the total loss of the circuit and the resistance $R_x$ connected in parallel with the specimens is considerably larger than $R_1$, and further, the capacitance $\Delta C_x$ is considerably larger than the capacitance $\Delta C$, then the vector $e_x$ in the diagram of FIGURE 7A will become vector $e'_x$. When the specimens are connected with the circuit, the vector $e_x$ is transferred to the position of vector $e'_{x1}$, as shown in FIGURE 7A, and the vector $e'_x$ lags the vector $e_x$ by $\phi_1$. The value $\tan \phi_1$ is shown by the following equation:

$$\tan \theta_1 = \frac{\frac{R_1}{R_x} - \frac{\Delta C_x}{\Delta C}\left(1 - \frac{R_1}{R_x}\right)}{2\left\{\frac{R_1}{R_x} - \frac{\Delta C_x}{\Delta C}\left(1 - \frac{R_1}{R_x}\right)\right\}} \quad (3)$$

In the above case, the vector $e_0$ is transferred to the position of vector $e'_0$ in the leading direction by angle $\phi_2$. The value $\tan \phi_2$ is expressed by the following equation:

$$\tan \theta_2 = \frac{\frac{R_1}{R_x} + \frac{\Delta C_x}{\Delta C}\left(1 - \frac{R_1}{R_x}\right)}{2\left\{\frac{R_1}{R_x} + \frac{\Delta C_x}{\Delta C}\left(1 - \frac{R_1}{R_x}\right)\right\}} \quad (4)$$

According, the phase angle between the vectors $e'_0$ and $e'_x$ varies by angle $(\phi_1 + \phi_2)$ from 90 degrees. The output current $I_g$ supplied to the meter 83 may be expressed by $$I_g = 4K \cdot e'_0 \cdot e'_x \tan (\phi_1 + \phi_2) \quad (5)$$

However, a detector may be used having square characteristics.

The vectors $e_x$ and $e_0$ are shown by the following equations, respectively:

$$e_x = \frac{AR_1}{\sqrt{1 + \omega^2 \cdot \Delta C^2 \cdot R_1^2}} \quad (6)$$

$$e_0 = \frac{AR_1'}{\sqrt{1 + \omega^2 \cdot \Delta C^2 \cdot R_1^2}} \quad (7)$$

wherein, if $R_1 = R'_1$ and $\omega \cdot \Delta C \cdot R_1 = 1$ and $\omega \cdot \Delta C \cdot R'_1 = -1$, the variation $\Delta e$ of $e_x$ and $e_0$ with the resistance variation $\Delta R$ and the capacitance variation $\Delta C_x$ are as follows:

$$\frac{\Delta e}{e_x} = \frac{\Delta e}{e_0} = -\frac{1}{2}\frac{\Delta C_x}{\Delta C} \quad (8)$$

$$\frac{\Delta e}{e_x} = \frac{\Delta e}{e_0} = \frac{1}{2}\frac{\Delta R_x}{\Delta R_1} \quad (9)$$

Therefore, the following equation is obtained:

$$e'_0 e'_x = e_0 e_x \left(1 - \frac{\Delta R}{R_1}\right) \quad (10)$$

Wherein, if $R_x \gg R_1$ $$\frac{\Delta R}{R_1} = \frac{R_1}{R_x} \quad (11)$$

By substituting the Equation 3 with the Equations 1, 2, 8 and 9, $$I_g = 4k \cdot e_0 \cdot e_x \left(\frac{R_1}{R_x}\right) \quad (12)$$

The Equation 10 does not include a term of the capacitance $\Delta C_x$ of the specimen. That is to say, in this apparatus, the output represents, the loss $R_x$ only of the specimen, and therefore, it may be used as a direct-reading loss-meter.

Figure 8:
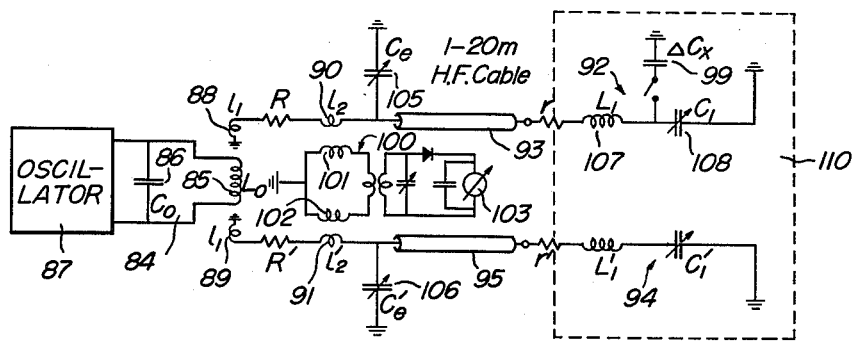
FIGURE 8 is a circuit diagram showing a further embodiment of the present invention.

Referring to FIGURE 8, a circuit 84 consisted of an inductance coil 85 and capacitor 86 is a tank circuit for an oscillator 87. The inductance coil 85 is magnetically coupled with small inductance coils (1–5 $\mu$h.) 88 and 89. These small inductance coils 88 and 89 are connected in series with other small inductance coils (5–10 $\mu$h.) 90 and 91, respectively. The coils 88 and 90 are connected in series with a main tuning circuit 92 through a high frequency coaxial cable 93 and the coils 89 and 91 are connected in series with another main tuning circuit 94 through a high frequency coaxial cable 95. Thus there are provided two series tuning circuits having identical constructions and circuit constants.

A detecting secondary circuit 100 is coupled with both the tuning circuits through coils 101 and 102 having mutual inductances M and M'. The tuning circuits are set so that the voltage $e_1$ induced in the coil 101 and the voltage $e'_1$ induced in the coil 102 are equal to each other and in phase opposition, when the two tuning circuits are tuned in the absence of a specimen 99 to be measured. Accordingly, the indicator 103 indicates zero point. The output $I_g$ of the detecting secondary circuit 100 is zero when the specimen having capacitance $\Delta C_x$ is not placed in the tuning circuit. Variable capacitances 105 and 106 are connected with the series tuning circuits between the coils 90 and 91 and the coaxial cables 93 and 95, respectively. The variable capacitances 105 and 106 are grounded.

The sum of the capacitance of the cable 93 and the capacitance 105 is expressed by with $Ce$, and the sum of the capacitance of the cable 95 and the capacitance 106 is expressed by $C'e$. In FIGURE 9, if the tuning circuits are set at tuning points $C_{1r}$ and $C'_{1r}$ respectively, or at points $C_{2r}$ and $C'_{2r}$ on the slope portions of the curves, the voltages $e_1$ and $e'_1$ are equal in magnitude to each other, but in opposite phases. Consequently, there is no output in the detecting circuit 100. However, in case the specimen 99 having capacitance $\Delta C_x$ is placed in the main tuning circuit between a coil 107 and a variable capacitance 108 in the main tuning circuit 92, an output is produced in the circuit 100 substantially depending upon the phase angle $\theta$ (in case of setting at the tuning point) or a voltage difference $\Delta e_1$ (in case of setting on the slope portions). In case of the setting at the tuning point, the magnitude of the voltage $e_1$ does not change. Consequently, the output in the circuit 100 is produced only by virtue of the phase angle $\theta$. In case of the setting on the slope portions of the curves, the phase angle $\theta$ is small while the variation of the voltage $e_1$ is large. Accordingly, the voltages $e_1$ and $e'_1$ can be made high as about 5-6 volts and a high sensitive meter may be selected as the indicator 103, thus making the circuit highly sensitive.

According to the present invention, the measuring head 110 can be transported or moved separately from the electric source and the indicating part 100, and the stability of the circuit is not affected by such transportation of the measuring head. The reason therefor is described below.

The high frequency coaxial cable should have electrostatic capacity of 40–70 pf. per meter, and if a length of several meters of the cable is used, the total electrostatic capacity is 200–400 pf. Assuming $Ce$ as the value of the total electrostatic capacity, and $\Delta Ce$ as its change due to temperature change or bending of the cable, $\Delta Ce$ may be substituted by the change $\Delta C_1$ of the capacity $C_1$ of the capacitor 108. The following equation applies to the above case:

$$\Delta C_1 = \frac{l^2}{L^2} \times \frac{1}{(1-\omega^2 \cdot l \cdot Ce)^2} \Delta Ce \quad (13)$$

where $l^2$ is the inductance of the coil 90 and $L$ is the inductance of the coil 107.

When the inductances $L$ and $l$ are selected to satisfy $L=(30-50)l$, and at the frequencies satisfying $$\omega^2 \cdot l \cdot C_2 \ll 1$$

the value of $\Delta C_1$ is very small even if $\Delta Ce$ is 0.5 to 1 pf. Therefore, there is not any influence on the stability of the circuit.

When the inductance $l$ is substituted by $(l_1+l_2)$ and small change $\Delta l$ of the inductance $l$ is substituted by small change $\Delta C_1$ of the capacitance $C_1$ of the capacitor 108, $\Delta C_1$ is as follows:

$$\Delta C_1 = \left(\frac{dl}{l}\right)\left(\frac{l}{L}\right)\left(\frac{1}{(1-\omega^2 \cdot l \cdot Ce)^2} C_1\right) \quad (14)$$

Since $\Delta C_1$ is very small, the influence of $\Delta C_1$ on the circuit may be neglected.

The most important problem is the difference between the characteristics of the tuning circuits. If the tuning circuits have identical constructions, circuit constants and temperature coefficients, there is no trouble. However, the coils and the capacitors forming one of the tuning circuits are not, in general, strictly identical with the corresponding coils and capacitors forming the other tuning circuit, and there will occur zero point shift in the indicator. In the circuit according to the present invention as shown in FIGURE 8, the above mentioned default can be compensated for by adjustment of the capacitances of the capacitors 105 and 108. For example, in case the capacitance $C_1$ of the capacitor 108 is changed by $\Delta C_x$ due to a temperature change, $\tan \theta$ is as follows:

$$\tan \theta = \frac{\Delta C_x}{\omega \cdot C_1^2 \cdot r \left[I + \frac{R}{r}\left\{1+\frac{C_e}{C_1}(1-\omega^2 \cdot L_1 \cdot C_1)\right\}^2\right]} \quad (15)$$

or $$\tan \theta = \frac{\Delta C_x}{\omega \cdot C_1^2 \cdot r \left\{1+\frac{R}{r}\frac{1}{(1-\omega^2 \cdot l \cdot C_e)^2}\right\}} \quad (16)$$

Thus, $$\frac{\partial \tan \theta}{\partial C_1} > 0 \quad (17)$$

As shown in FIGURE 10A, the tuning action is established by 1 and $Ce+Ct$, but $\tan \theta$ becomes large in accordance with the increase in the capacity $C_1$ and the decrease in the capacity $Ce$. Thus, $$C_t = \frac{C_1}{1-\omega^2 \cdot L_1 \cdot C_1} \quad (18)$$

This results in an increase of the sensitivity.

A series circuit, shown in FIGURE 10A, comprising an inductance $L_1$ and a capacitance $C_1$ operates as an equivalent capacity $Ct$ in the range of $\omega^2 \cdot L_1 \cdot C_1 < 1$. In this case, the equivalent capacity $Ct$ may be made in comparison to the capacity $C_1$. As $\omega^2 \cdot L_1 \cdot C_1$ approaches 1, the capacity $Ct$ gets larger. This is a characteristic feature of the present invention. A small change in the capacity $Ct$ with respect to a small change in the capacity $C_1$ is as follows:

$$\Delta C_t = \frac{\Delta C_1}{(1-\omega^2 \cdot L_1 \cdot C_1)^2} \quad (19)$$

and $$\Delta C_t \gg \Delta C_1$$

The sensitivity of the circuit becomes better, if the capacitance $C_1$ gets larger and the capacitance $C_e$ of the capacitor 105 gets smaller. In the circuit, the zero point shift can be compensated for by increasing the capacitance of the capacitor 105 and by decreasing the capacitance of the capacitor 108. The change in the capacitance may be reversed.

In case of using the slope portions of the curves, the maximum inclination is as follows:

$$\frac{\partial e}{\partial C} = \tan \theta \max$$

$$\tan \theta \max = \frac{K(1-\omega^2 \cdot l \cdot C_e)^2}{\omega \cdot C_1^4 \{R+r(1-\omega^2 \cdot l \cdot C_e)^2\}^3} \quad (20)$$

$$\frac{\partial \tan \theta \max}{\partial C_e} > 0 \quad (21)$$

In this case, $\tan \theta$ becomes larger when the capacitance $C_e$ is increased and the capacitance $C_1$ is decreased.

Figure 12:
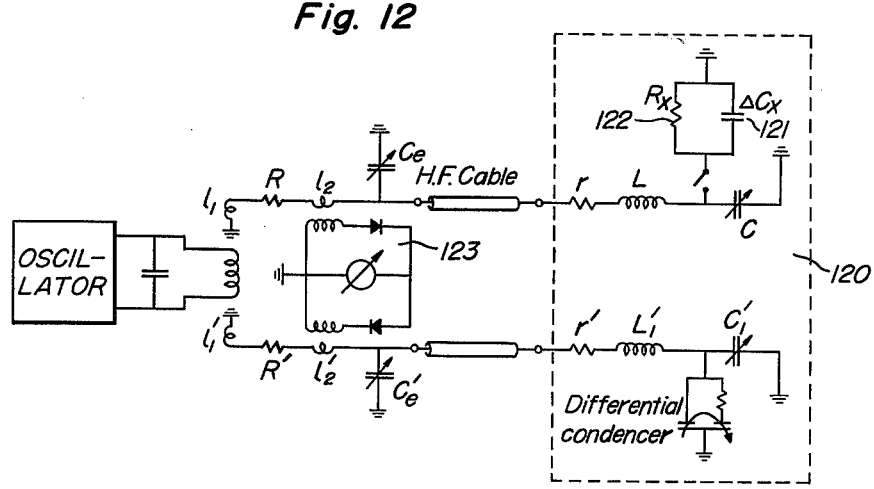
FIGURE 12 is a circuit diagram showing a still further embodiment of the present invention.

A circuit shown in FIGURE 12 is same as the circuit shown in FIGURE 8, except the tuning head 120. Therefore, explanations relating to this circuit is omitted. In this circuit, the capacitance 121 and the loss resistance 122 of the specimen are used for operating the detecting circuit 123.

What I claim is:

1. A highly sensitive and stable multiple-tuned electrical measuring apparatus for measuring a small capacitance, comprising, a stabilized high-frequency oscillator, a tank circuit connected to said oscillator, a wave detecting circuit coupled to said tank circuit and comprising inductances, a pair of coaxial cables having substantially alike electrical characteristics connected in series with respective ones of said inductances, other inductances in series with the first mentioned inductances and said coaxial cables, grounded, tunable capacitors connected to respective ones of said other inductances and jointly with all of said inductances and said coaxial cables defining two tunable resonant circuits connections for connecting an element comprising reactance to one of said resonant circuits for measurement of the value of said reactance, and a phase difference detecting circuit coupled to the first-mentioned inductances for detecting a phase difference between said resonant circuits representative of the value of the reactance of said element when said element is connected to said connections, and means connected to said phase difference detecting circuit to indicate said value of reactance.

2. An electrical measuring apparatus according to claim 1, in which said coaxial cables comprise connections to ground and in which said capacitors are connected in parallel with said connections to ground.

3. An electrical measuring apparatus according to claim 1, in which said connections for connecting an element to said one of said resonant circuits are connected in parallel with a respective one of said tunable capacitors.

4. An electrical apparatus according to claim 3, in which each of said resonant circuits includes a resistor in parallel with a respective ground capacitor, and in which said tunable capacitors are tunable for causing resonant currents in said resonant circuits to be displaced from the tuning point at 45° in opposite directions from said tuning point, whereby when said element is connected to said one resonant circuit a resistance component representative of the resistance of said element is detectable in said phase difference detecting circuit, and said means to indicate said value of reactance comprising means to indicate the value of said resistance component.

5. A highly sensitive and stable multiple-tuned electrical measuring apparatus for measuring reactance and resistance comprising; a high-frequency source; a pair of tunable resonant circuits; each resonant circuit including; a small inductance for introducing voltages from said source to a respective resonant circuit, another small inductance for detection and indication defining a detection section, a main tuning coil and a main tuning capacitor in series, a measuring section comprising an inductance coil and a capacitor, a high-frequency coaxial cable coupling said detecting section and said measuring section, means in each resonant circuit for causing the resonant circuit to function equivalent to an electro-static capacitor in which the output of said detecting section is fixed a zero comprising a variable capacitor in parallel with said small inductances, whereby the capacitors in said resonant circuits are settable to a constant condition, connections for connecting to one of said resonant circuits elements comprising reactance and resistance, and means coupled to said resonant circuits to read out the value of said reactance and said resistance.

References Cited by the Examiner

UNITED STATES PATENTS

| | | | |
|---|---|---|---|
| 2,178,471 | 10/39 | De Bruin | 324—57 X |
| 2,188,628 | 1/40 | Freystedt | 324—60 X |
| 2,689,329 | 9/54 | Zimmerman | 324—60 X |
| 2,906,950 | 9/59 | Ichijo | 324—57 X |
| 2,943,258 | 6/60 | Shawhan | 324—57 |
| 3,030,576 | 4/62 | Van Jaarsvelt et al. | 324—57 |
| 3,096,591 | 7/63 | Higgins et al. | 324—61 X |

FOREIGN PATENTS 565,700    11/58    Canada.

WALTER L. CARLSON, *Primary Examiner.*